Figure 1:
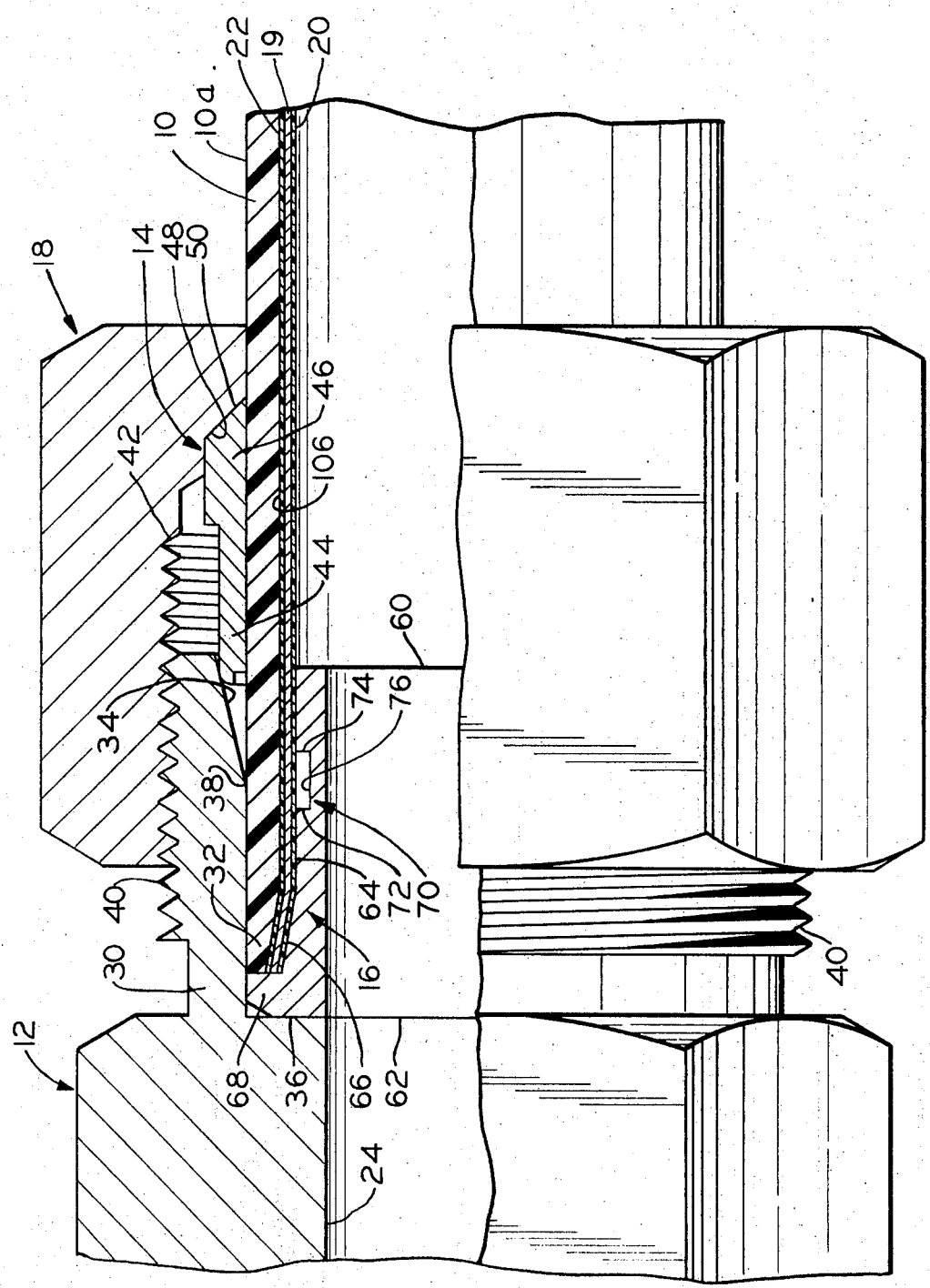

United States Patent [19]
Niemeyer

[11] 3,836,700
[45] Sept. 17, 1974

[54] CONDUIT COUPLING

[75] Inventor: Robert W. Niemeyer, Avon Lake, Ohio

[73] Assignee: Alco Standard Corporation, Valley Forge, Pa.

[22] Filed: Dec. 6, 1973

[21] Appl. No.: 422,309

[52] U.S. Cl................ 174/89, 174/75 C, 339/95 R, 339/89 R, 285/248
[51] Int. Cl............................................. H02g 15/08
[58] Field of Search................. 174/89, 88 C, 75 C; 339/95 R, 95 A, 97 R, 97 P, 176 R, 177 R, 177 E, 89 R, 89 M; 285/242, 243, 245, 246, 248, 249

[56] References Cited
UNITED STATES PATENTS
3,344,227  9/1967  Gilmartin et al................. 174/89 X
3,769,444  10/1973  Malik................................ 174/75 C
FOREIGN PATENTS OR APPLICATIONS
1,491,400  7/1967  France................................ 174/89

Primary Examiner—Darrell L. Clay
Attorney, Agent, or Firm—Meyer, Tilberry & Body

[57] ABSTRACT

A coupling connection is disclosed for providing a fluid tight seal, electrical continuity and restraint against axial separation between a metal coupling body and tubular plastic telephone wire conduit, the inner surface of which conduit is lined with an electrically conductive metal foil and a covering film of plastic. During assembly of the coupling connection, the coupling components cooperate to axially displace and radially deform the plastic conduit to establish areas of sealing engagement therebetween. The radial deformation provides an interengaging relationship between the conduit and coupling components to restrain axial separation of the conduit from the coupling body, and cause penetration of the plastic film covering the conductive foil by one of the coupling components to establish electrical contact therebetween.

8 Claims, 3 Drawing Figures

CONDUIT COUPLING

This invention relates to the art of coupling connections and, more particularly, to a coupling connection between a coupling body of conductive material and a conductively lined non-metallic tube or conduit.

In the field of communications, conductors such as telephone wires often extend from one location to another in a distribution system through a non-metallic tubular conduit in which a gas such as dry air or nitrogen under pressure is circulated to maintain the conductors dry. The conduit may be a plastic, such as polyethylene, having a lining on the inner surface thereof including a conductive metal foil covered with plastic to insulate the foil from the conductors in the conduit. The foil provides a conductive path along the conduit for grounding purposes, and adjacent sections of the conduit as well as the terminal ends thereof in the distribution system are coupled together, or with terminal couplings, so that electrical continuity is provided throughout the length of the conduit.

Coupling connections of the foregoing character are subjected to rigid test conditions for acceptability. In this respect, for example, the juncture between a conduit end and coupling body must adequately seal against leakage of gas under pressure, under static temperature conditions and under the varying temperatures to which the system may be exposed during use. Moreover, the coupling connection must adequately restrain axial separation of the conduit from the coupling body in response to an axial pulling force applied thereto. At the same time, the coupling connection must provide electrical continuity between the conductive lining of the conduit and the coupling body.

Previous efforts to provide a coupling connection to meet the rigid test requirements of the communication industries, including those requirements specifically pointed out hereinabove, have only been partially successful. In this respect, the previous efforts have not produced a coupling connection which satisfies all of the requirements of the industry. For example, a coupling may adequately seal against gas leakage and provide electrical continuity, but fail the tensional load test, or, alternatively, adequately restrain against axial separation and provide electrical continuity, while failing to adequately seal the juncture between the conduit and coupling body. Still further, the coupling structure heretofore provided to achieve electrical continuity together with sealing and restraint against axial separation have been undesirably complex, thus increasing both the cost of manufacture and assembly or installation costs.

In view of the foregoing, it will be appreciated that there is a need for a coupling connection which will meet all of the requirements of the communications industry with regard to leakage, axial separation and electrical continuity and which, at the same time, minimizes production costs and assembly time. The present invention fills this need by providing a coupling connection comprised of a minimum number of parts of relatively simple construction and which are structurally interrelated to achieve a gas tight seal between the conduit and coupling body, interengagement against axial separation, and electrical continuity between the conductive lining and coupling body in response to movement of the components of a coupling connection into assembled relationship. More particularly, the coupling assembly includes an insert of conductive metal receivable in the end of the conduit and which, with the conduit, is receivable in a chamber of the coupling body. A sleeve surrounds the conduit and is axially displaceable relative to the coupling body to engage the outer surface of the conduit in a manner whereby the conduit is displaced axially inwardly of the body chamber into gas tight sealing relationship therewith and is radially compressed relative to the insert. The insert is provided with a recess into which the material of the conduit and inner lining are pressed so that the edges of the recess penetrate the insulating film on the inner surface of the conduit and engage the conductive lining to establish a path of electrical continuity between the conductive lining and couping body through the insert. Further, the foregoing sealing and penetrating actions take place in response to axial displacement of the sleeve by forcing means such as a coupling nut threadedly engaged with the coupling body to impart axial displacement to the sleeve in response to rotation of the coupling nut to advance the latter onto the coupling body.

Accordingly, it is an outstanding object of the present invention to provide a coupling connection between a conductively lined non-metallic conduit and a coupling body to seal the juncture between the conduit and body and to provide electrical continuity between the conductive lining and body.

Another object is the provision of a coupling connection of the foregoing character in which the coupling components are operable upon assembly to penetrate an insulating film covering with conductive lining in the conduit to establish an electrical path between the conductive lining and the body of the coupling.

Yet another object is the provision of a coupling connection of the foregoing character in which the components are operable upon assembly thereof to interengage the non-metallic conduit and coupling body to seal the juncture therebetween and restrain axial separation of the conduit from the coupling body.

Still another object is the provision of a coupling connection of the foregoing character in which the coupling components are structurally cooperable to achieve radial constriction of the non-metallic conduit to restrain axial separation of the conduit from the coupling body and penetration of the insulation covering the conductive lining to establish electrical condinuity between the conductive lining and coupling body.

Still a further object of the present invention is the provision of a coupling connection of the foregoing character which is comprised of a minimum number of component parts, compactly interrelated structurally, and readily assembled to achieve a gas tight seal between the conduit and coupling body, retention against axial separation of the conduit from the body, and electrical continuity between the conductive lining and body.

Figure 2:
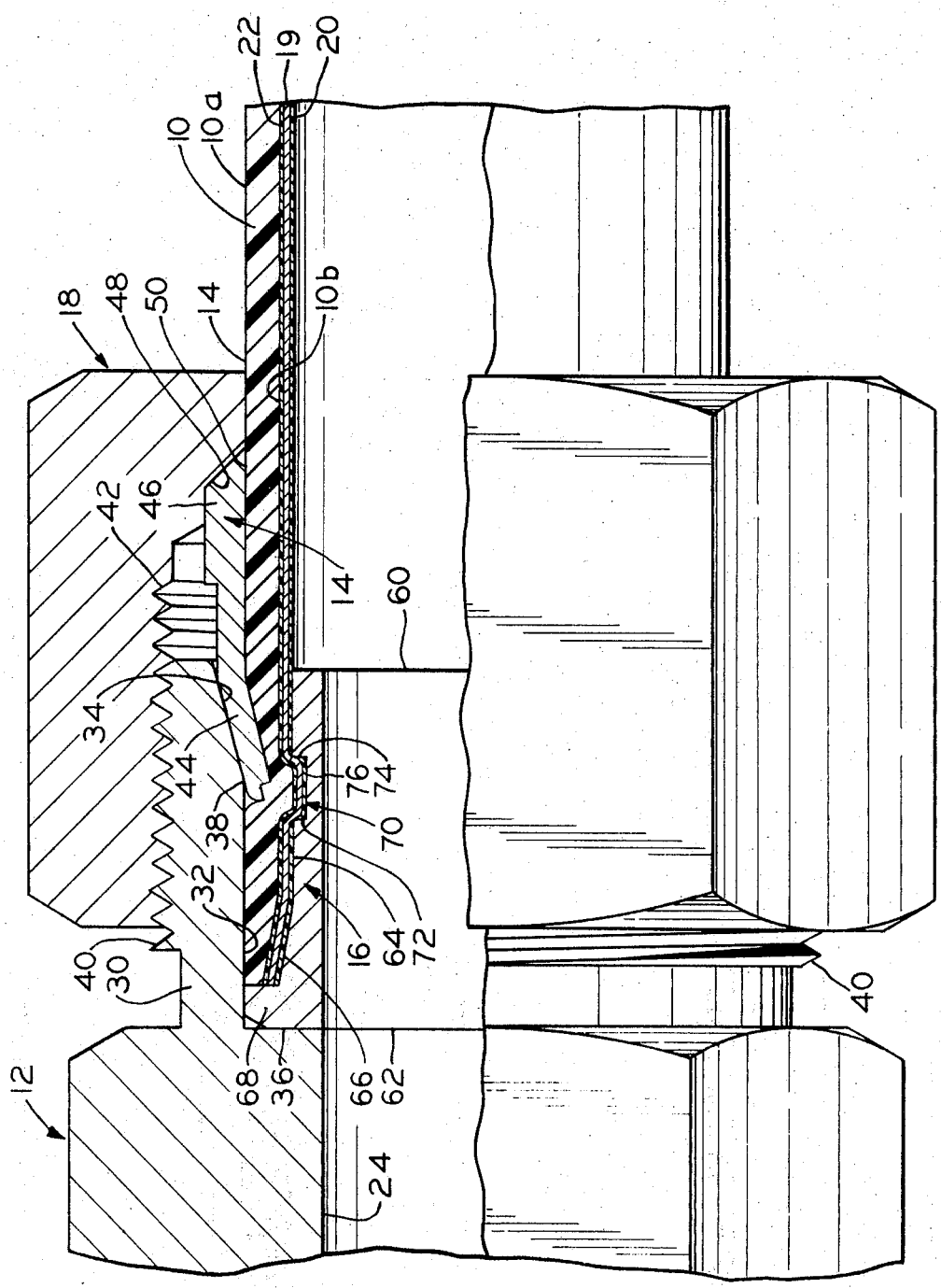
Figure 3:
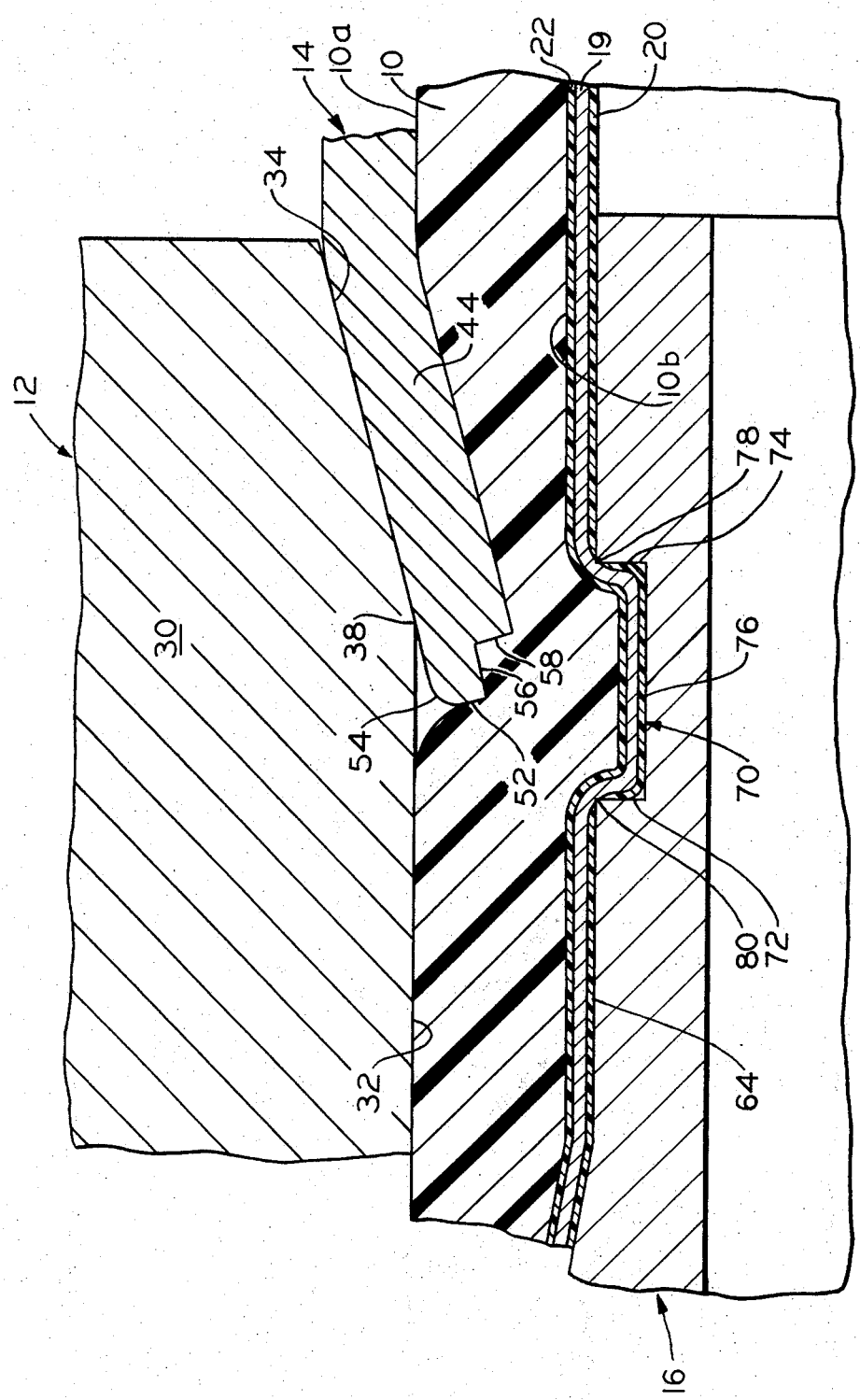

The foregoing objects, and others, in part will be obvious and in part pointed out more fully hereinafter in conjunction with the written description of the preferred embodiment of the invention illustrated in the accompanying drawings in which:

FIG. 1 is an enlarged side view, partially in section, of the coupling components and conduit of a coupling connection according to the present invention, and illustrating the components in partially assembled relationship;

FIG. 2 is an enlarged fragmentary cross-sectional view of the coupling components and conduit illustrated in FIG. 1, showing the components and conduit is fully assembled relationship; and, FIG. 3 is an enlarged fragmentary section of a portion of the assembled coupling components and conduit illustrated in FIG. 2, and showing in detail the structural interrelationship by which electrical continuity between the conductive lining and coupling body and restraint against separation of the conduit from the coupling body are achieved.

Referring now in greater detail to the drawings in which the showings are for the purpose of illustrating a preferred embodiment of the invention only and now for purpose of limiting the invention, the coupling connection includes a non-metallic conduit 10, a coupling body 12, a sleeve 14, an insert 16 and a coupling nut 18, which components are illustrated in partially assembled relationship in FIG. 1.

Conduit 10 includes an outer surface 10a and an inner surface 10b. Inner surface 10b is provided with a conductive lining comprised of a thin layer of conductive metal 19 covered on its radially inner and outer faces with tin layers of insulating material 20 and 22, respectively. In the embodiment disclosed, conduit 10 is produced from black polyethylene, conductive layer 19 is an aluminum foil, and insulating layers 20 and 22 are films or coatings of a polyethylene copolymer compound fused to the opposite sides of the foil. Non-metallic conduit of this structure is available from the Northern Electric Company, Limited of Montreal, Quebec, Canada under the trade name of NE AIR PIPE. The latter conduit has an outside diameter of about 0.74 inch and an inside diameter of about 0.60 inch measured with respect to the inner surface of layer 20. Metal layer 19 is approximately 0.005 inch thick, and insulating layers 20 and 22 are each approximately 0.002 inch thick. Conduit of this structure is particularly suited for use as pressured conduit for communication conductors such as telephone wires, and the conductive foil serves as a ground to minimize or eliminate noise or static during communication. While the conduit disclosed herein is preferred, it will be readily appreciated that conduits of other non-metallic material can be employed having insulated conductive lining materials and arrangements other than that illustrated herein. It is only necessary that the conductive metal have a film, coating or layer of insulating material on the radially inner face thereof to insulate the conductive metal from the interior of the conduit.

Coupling body 12 includes an annular wall 30 axially bored to provide a chamber opening into the body and including an annular wall 32 and a cam wall 34. The inner end of the chamber is defined by a shoulder 26 extending radially inwardly from the axial inner end of annular wall 32. A bore or passage 24 extends axially inwardly of body 12 from shoulder 36 to receive the conductors, not illustrated, which pass into the body from conduit 10. Annular wall 32 has an axial outer end 38, and cam wall 34 extends axially and radially outwardly from end 38 at an angle of about 15° relative to the axis of annular wall 32. The outer surface of wall 30 of the coupling body is provided with threads 40 adapted to cooperatively engage with threads 42 on the inner surface of coupling nut 18.

Sleeve 14 is bored to slideably receive conduit 10 and, preferably, the diameter of the bore is not less than the outside diameter of the conduit. The sleeve has a contractible axial inner end 44 and an axial outer end 46 which terminates in a tapered cam face 48. Coupling nut 18 is provided with a mating cam shoulder 50 for the purpose set forth hereinafter. Contractible end portion 44 of sleeve 14 terminates in an end wall 52 having a circumferential outer edge 54 adapted to engage cam wall 34, and a circumferential inner edge adapted upon constriction of end 44 of the sleeve to radially deform conduit 10. In the embodiment illustrated, the circumferential inner edge of contractible portion 44 is defined by an annular recess having an axially extending circumferential wall 56 intersecting end wall 52, and a radially inwardly extending wall 58 intersecting the inner surface of the sleeve as defined by the bore therethrough. Preferably, walls 56 and 58 are perpendicular to one another and to the sleeve surfaces intersected thereby. Circumferential outer edge 54 preferably is a rounded edge providing a cam surface for engagement with cam wall 34 of the body portion. Contractible end portion 44 is of substantially uniform radial thickness along the length thereof, and axial outer end portion 46 of the sleeve is radially enlarged with respect thereto to avoid deformation of the outer end portion during tightening of coupling nut 18 onto body 12.

Insert 16 is produced from electrically conductive metal and is provided with a bore extending therethrough between axial inner end 60 and axial outer end 62 thereof. The insert extends into the end of conduit 10 and has an annular outer surface engaging the inner surface of plastic film 20 of the conduit lining. The annular outer surface includes a first portion 64 of generally uniform diameter extending from inner end 60 toward outer end 62 of the insert, and a second portion 66 extending axially and radially outwardly from surface portion 64 toward outer end 62 of the insert. Second portion 66 of the outer surface is inclined with respect to surface portion 64 to flare the end of conduit 10 radially outwardly upon introduction of the insert into the conduit. A flange 68 at the outer end of the insert extends radially outwardly of surface 66 and circumferentially thereof to axially position the insert within the tube. The axial outer face of flange 68 defines axial outer end 62 of the insert and abuts against shoulder 36 in the coupling body when the components are in assembled relationship. The diameter of annular outer surface portion 64 preferably is no greater than the inner diameter of conduit 10 as defined by the inner surface of the lining therein.

Outer surface portion 64 of sleeve 14 is provided circumferentially with a recess 70 defined by axially spaced sidewalls 72 and 74 and a bottom wall 76. Preferably, bottom wall 76 is parallel to surface portion 64, and sidewalls 72 and 74 extend perpendicular with respect to bottom wall 76 and outer surface portion 64. Recess 70 circumferentially underlies an axial portion of conduit 10 and the lining on the inner surface thereof, whereby the latter portion of the conduit and lining are unsupported by sleeve 14 in the area or recess 70. When the components of the assembly are prepositioned as illustrated in FIG. 1, recess 70 in sleeve 14 and cam wall 34 in coupling body 12 are relatively positioned axially so that the constriction end portion 44, upon camming engagement of sleeve edge 54 with cam wall 34, radially deforms both the outside and inside surfaces of conduit 10 and the lining therein in an axial area overlying the recess. Such radial deformation is achieved in the manner and for the purpose set forth more fully hereinafter.

Coupling nut 18 provides forcing means for engaging the axial outer end of sleeve 14 and displacing the sleeve axially inwardly relative to coupling body 12. As the coupling nut is rotated relative to coupling body 12 to advance the coupling nut toward the body, outer edge 54 of sleeve 14 engages cam wall 34, whereby the circumfereneial inner edge of contractible end portion 44 of the sleeve is cammed axially and radially inwardly into engagement with the outer surface of conduit 10. The annular recess defining the circumferential inner edge of the sleeve engages the outer surface of the conduit and forces the conduit axially inwardly of the chamber in the coupling body and, at the same time, radially deforms the outer and inner surfaces of the conduit and the lining for the portion of the conduit material and lining overlying recess 70 to be displaced thereinto, as illustrated in FIGS. 2 and 3 of the drawing.

Axial displacement of the conduit toward the coupling body chamber causes axial compression and thus radial expansion of the material of the conduit with respect to the circumferential space defined by the outer surface of insert 16, the radial face of flange 68, and annular wall portion 32 of the coupling body chamber. The compression and expansion of the conduit material in the circumferential space provides a seal against gas leakage between the inner surface of the conduit and the outer surface of insert 16 and between the outer surface of the conduit and chamber wall 32.

Radial deformation of the outer and inner surfaces of the conduit in the area overlying recess 70 provides for a portion of the conduit material to be exuded into the recess 70 together with the portion of the lining overlying the recess. As best seen in FIG. 3, the displacement of the conduit material and lining into the recess causes the recess edges 78 and 80 to penetrate the inner plastic film 20 so as to contact metal foil 19. It will be appreciated that recess 70 has a radial depth sufficient to achieve at least such minimum penetration, and that recess edges 78 and 80 are sufficiently sharp to assure penetration of the plastic film upon displacement of the conduit material and lining into the recess. Still further, it will be appreciated that the axial space between recess edges 78 and 80 and the radial thickness of contractible end portion 44 of sleeve 14, together with the realtive axial positioning of recess 70 and cam wall 34 are so related that the conduit material and lining are displaced into the recess and for such displacement to cause the desired penetration of the plastic film.

Displacement of the material of the conduit and lining into the recess, and the resulting penetration of the lining, provides an electrical path between foil 19 and coupling body 12. In this respect, the material of insert 16 is electrically conductive and flange 68 of the insert is disposed in abutting relationship with shoulder 36 in the body chamber. Penetration of the lining by corners 78 and 80 of recess 70 provides for foil 19 to contact insert 16 and establish an electrical path therebetween. It is preferred, to assure the best possible electrical contact, that recess edges 78 and 80 do not penetrate completely through conductive foil 19. In this respect, such penetration could result in axial spreading of the cut edges of the foil and displacement thereof from contact with the insert.

In addition to establishing electrical contact between foil 19 and body 12, radial displacement of the material of conduit 10 into recess 70 provides two additional lines of gas tight sealing engagement between the components of the assembly. In this respect, the material of the conduit is radially compressed against the edges 78 and 80 of recess 70 to provide axially spaced circumferentially extending lines of seal between the conduit and insert to seal against leakage along the insert between the outer surface thereof and the inner surface of the conduit lining.

Still further, radial deformation of the outer surface of conduit 10 by the contractible end portion 44 of sleeve 14, together with radial displacement of the material of the conduit and lining into recess 70, provides circumferential areas on the outer and inner sides of the conduit which increase the capability of the coupling components to cooperatively restrain axial separation of the conduit from the coupling body. In this respect, an axial force on conduit 10 tending to withdraw the conduit from the coupling body chamber is opposed by contractible end portion 44 of sleeve 14, the position of which is fixed with respect to the coupling body by coupling nut 24. Axial withdrawal is further opposed by the interrelationship between recess wall 72 and the contractible inner end of sleeve 14. In the latter respect, an axial force on conduit 10 outwardly of the coupling body tends to withdraw the tube and insert 16 as a unit from the body chamber. Any such movement of insert 16 causes compression of the conduit material in the area between recessed wall 72, end wall 52 of contractible end portion 44 and recess walls 56 and 58 defining the circumferential inner edge of the latter. Accordingly, it will be appreciated that axial movement of insert 16 and conduit 10 axially outwardly of body portion 12 is opposed by the force resulting from compression of the conduit material in the foregoing manner.

The specific dimensions of the components of the coupling connection will of course vary in accordance with the size of the conduit to be coupled. The following dimensions are given as an example and with respect to the components illustrated and described herein for connecting a conduit having the dimensions set forth herein above with a coupling body of brass. Bore 24 in the coupling body is ½ inch in diameter, and annular chamber wall 32 has a diameter of from 0.742 to 0.745 inch. Cam wall 34 extends at an angle of 15° with respect to the axis of chamber wall 32, and the chamber has an axial depth from the axial outer end of cam wall 34 to shoulder 36 of from 0.525 to 0.535 inch. Cam wall 34 has a diameter at the axial outer end thereof of from 0.818 to 0.821 inch. Sleeve 14 is brass and has an axial length of from 0.540 to 0.545 inch and an inside diameter of from 0.740 to 0.742 inch. Deformable inner end portion 44 of the sleeve has an outside diameter of from 0.818 to 0.820 inch and an axial length from end wall 52 of about 11/32 inch. Axial outer end portion 46 of the sleeve has an outside diameter of from 0.861 to 0.865 inch, and cam face 48 inclines at an angle of 45° with respect to the axis of the insert. Circumferential wall 56 of the recess in contractible end portion 44 of the sleeve has a diameter of from 0.775 to 0.778 inch and an axial depth from end wall 52 of from 0.020 to 0.23 inch. Circumferential outer edge 54 of the sleeve has a radius of curvature of from 0.010 to 0.015 inch. Insert 16 is brass and has an axial length of from 0.533 to 0.538 inch, annular outer surface portion 64 thereof has an axial length from the inner end of the insert of 11/32 inch, and inclined portion 66 of the outer surface has an axial length of 4/32 inch and inclines at an angle of 10° with respect to the axis of the insert. Outer surface portion 64 has a diameter of from 0.572 to 0.575 inch, and the inside diameter of the insert is ½ inch. Flange 68 has an outside diameter of from 0.738 to 0.740 inch. Recess 70 has an axial width of from 0.085 to 0.090 inch, and wall 78 of the recess intersects outer surface 64 along a circumferential line disposed from 0.123 to 0.125 inch from axial inner end 60 of the insert. Bottom wall 76 of the recess has a diameter from 0.546 to 0.549 inch. Recess edges 76 and 78 have a maximum radius of 0.005 inch. The coupling nut is brass and cam shoulder 50 thereof inclines at an angle of 45° with respect to the nut axis.

While considerable emphasis has been placed herein on the fact that the coupling connection has particular utility in conjunction with telephone wire distribution systems, it will be appreciated that the coupling connection is suited for other applications in which electrical continuity is desired between a conductively lined conduit and the body of the coupling, and in which the conduit serves a purpose other than that of providing a conduit for conductors such as telephone wires. Further, while the invention has been described in its preferred form and with a certain degree of particularity, it will be appreciated that many embodiments of the invention can be made and that many changes can be made in the embodiment herein illustrated and described without departing from the principles of the invention. Accordingly, it is to be distinctly understood that the foregoing descriptive matter is to be interpreted as illustrative of the present invention and not as a limitation.

Having thus described my invention, I claim:

1. A coupling connection between a body of electrically conductive metal and a conduit of non-metallic material, said conduit having annular inner and outer surfaces, a layer of electrically conductive material on said inner surface, a layer of penetratable insulating material on said conductive layer, said conductive layer being between said insulating layer and said inner surface, a sleeve having a bore with said conduit extending therethrough, said sleeve having a contractible end portion terminating in an end wall having a circumferential outer edge and a circumferential inner edge capable of deforming said conduit, said body having a chamber opening thereinto and including an annular wall having axial inner and outer ends and a shoulder at said inner end extending radially inwardly of said annular wall, a tubular insert of electrically conductive metal extending into said conduit, said insert having axial inner and outer ends and an annular outer surface engaging said layer of insulating material, a flange extending radially outwardly of said annular outer surface at said outer end of said insert axially positioning said insert in said conduit, said annular outer surface of said insert including a circumferential recess between said inner and outer ends thereof, said circumferential recess having axially spaced sidewalls intersecting said annular outer surface defining recess edges extending circumferentially of said insert, said conduit and insert being axially received in said body chamber with said outer end of said insert engaging said shoulder, said chamber including a cam wall extending radially and axially outwardly from said outer end of said annular chamber wall receiving the contractible end portion of said sleeve, forcing means engaging said sleeve axially outwardly of said end wall forcing the outer edge of said contractible end portion of said sleeve against the cam wall and camming the circumferential inner edge of said sleeve against the outer surface of said conduit, a portion of the material of said conduit, insulating layer and conductive layer extending radially into said circumferential recess, and said recess edges penetrating said insulating layer and contracting said conductive layer.

2. The coupling connection according to claim 1, wherein said circumferential recess in said insert has a circumferential bottom wall parallel to the axis of the insert, said axially spaced sidewalls of said circumferential recess extending perpendicular to said bottom wall and annular outer surface of said insert.

3. The coupling connection according to claim 1, wherein said annular outer surface of said insert includes a tapered portion flaring the end of said conduit.

4. The coupling connection according to claim 3, wherein said circumferential recess in said insert has a circumferential bottom wall parallel to the axis of the insert, said axially spaced sidewalls of said circumferential recess extending perpendicular to said bottom wall and annular outer surface of said insert.

5. The coupling connection according to claim 3, wherein said circumferential inner edge of said sleeve has an annular recess having an axially extending circumferential wall intersecting said end wall and a radially inwardly extending wall intersecting the inner surface of the bore in said sleeve.

6. The coupling connection according to claim 5, wherein said circumferential recess in said insert has a circumferential bottom wall parallel to the axis of the insert, said axially spaced sidewalls of said circumferential recess extending perpendicular to said bottom wall and annular outer surface of said insert.

7. The coupling connection according to claim 1, wherein said circumferential inner edge of said sleeve has an annular recess having an axially extending circumferential wall intersecting said end wall and a radially inwardly extending wall intersecting the inner surface of the bore in said sleeve.

8. The coupling connection according to claim 7, wherein said circumferential recess in said insert has a circumferential bottom wall parallel to axis of the insert, said axially spaced sidewalls of said circumferential recess extending perpendicular to said bottom wall and annular outer surface of said insert.

* * * * *